US009944834B2

(12) United States Patent
Carlson et al.

(10) Patent No.: US 9,944,834 B2
(45) Date of Patent: Apr. 17, 2018

(54) REACTIVE FILM ADHESIVES WITH ENHANCED ADHESION TO METALLIC SURFACES

(71) Applicant: H.B. Fuller Company, St. Paul, MN (US)

(72) Inventors: Brian W. Carlson, Woodbury, MN (US); Rituparna Paul, St. Paul, MN (US); Mutombo J. Muvundamina, Johnson City, TN (US); Felix D. Mai, Ludwigshafen (DE)

(73) Assignee: H.B. Fuller Company, St. Paul, MN (US)

( * ) Notice: Subject to any disclaimer, the term of this patent is extended or adjusted under 35 U.S.C. 154(b) by 92 days.

(21) Appl. No.: 14/969,900

(22) Filed: Dec. 15, 2015

(65) Prior Publication Data
US 2016/0168423 A1  Jun. 16, 2016

Related U.S. Application Data

(60) Provisional application No. 62/091,942, filed on Dec. 15, 2014, provisional application No. 62/091,956, filed on Dec. 15, 2014.

(51) Int. Cl.
*C09J 175/04* (2006.01)
*C09J 7/00* (2018.01)
*C09J 5/04* (2006.01)
*C09J 5/06* (2006.01)
*B32B 7/12* (2006.01)
*B32B 15/095* (2006.01)
*B32B 27/40* (2006.01)
*B32B 27/28* (2006.01)
*B32B 37/12* (2006.01)
*B32B 37/16* (2006.01)
*B32B 15/14* (2006.01)
*B32B 15/18* (2006.01)
*C09J 175/00* (2006.01)

(52) U.S. Cl.
CPC ............ *C09J 175/04* (2013.01); *B32B 7/12* (2013.01); *B32B 15/095* (2013.01); *B32B 15/14* (2013.01); *B32B 15/18* (2013.01); *B32B 27/28* (2013.01); *B32B 27/40* (2013.01); *B32B 37/1207* (2013.01); *B32B 37/16* (2013.01); *C09J 5/04* (2013.01); *C09J 5/06* (2013.01); *C09J 7/00* (2013.01); *B32B 2037/1253* (2013.01); *B32B 2037/1269* (2013.01); *B32B 2262/0261* (2013.01); *B32B 2307/50* (2013.01); *B32B 2375/00* (2013.01); *B32B 2405/00* (2013.01); *B32B 2457/00* (2013.01); *B32B 2471/02* (2013.01); *B32B 2605/00* (2013.01); *C09J 175/00* (2013.01); *C09J 2475/00* (2013.01); *C09J 2475/003* (2013.01)

(58) Field of Classification Search
CPC ............ C09J 175/04; B32B 5/24; B32B 7/12
See application file for complete search history.

(56) References Cited

U.S. PATENT DOCUMENTS

| | | | |
|---|---|---|---|
| 5,143,987 A | 9/1992 | Hansel et al. | |
| 5,470,899 A | 11/1995 | Gulbins | |
| 5,492,961 A | 2/1996 | Brock et al. | |
| 5,608,000 A | 3/1997 | Duan et al. | |
| 5,610,232 A | 3/1997 | Duan et al. | |
| 5,654,391 A | 8/1997 | Gobel | |
| 5,703,158 A | 12/1997 | Duan et al. | |
| 5,710,215 A | 1/1998 | Abend | |
| 6,017,998 A | 1/2000 | Duan et al. | |
| 6,348,548 B1 | 2/2002 | Abend | |
| 6,593,435 B2 | 1/2003 | Abend | |
| 6,686,415 B1 | 2/2004 | Terfloth et al. | |
| 6,797,764 B2 | 9/2004 | Sagiv et al. | |
| 7,498,380 B2 | 3/2009 | Ganster et al. | |
| 8,846,198 B2 | 9/2014 | Buchner et al. | |
| 2002/0022680 A1 | 2/2002 | Guse et al. | |
| 2002/0164486 A1 | 11/2002 | Guse et al. | |
| 2003/0100626 A1 | 5/2003 | Sapper et al. | |
| 2003/0157337 A1 | 8/2003 | Abend | |
| 2004/0204520 A1 | 10/2004 | Bell et al. | |
| 2005/0288430 A1 | 12/2005 | Gindin et al. | |
| 2008/0171208 A1 | 7/2008 | Buchner et al. | |
| 2008/0262131 A1 | 10/2008 | Linnenbrink et al. | |
| 2009/0123757 A1 | 5/2009 | Pudleiner | |
| 2009/0227724 A1 | 9/2009 | Ganster et al. | |
| 2009/0240005 A1 | 12/2009 | Kraus et al. | |
| 2010/0193591 A1 | 8/2010 | Rancien et al. | |
| 2011/0244228 A1 | 10/2011 | Blum et al. | |
| 2012/0012251 A1 | 1/2012 | Burckhardt et al. | |
| 2012/0021196 A1 | 1/2012 | Kenney | |
| 2012/0112133 A1 | 5/2012 | Bahnmüller et al. | |
| 2012/0171459 A1 | 7/2012 | Herbert | |
| 2013/0273375 A1 | 10/2013 | Achten et al. | |
| 2015/0017452 A1 | 1/2015 | Schmitz-Stapela et al. | |

(Continued)

FOREIGN PATENT DOCUMENTS

| CA | 2355908 | 6/2000 |
|---|---|---|
| GB | 2400104 | 6/2014 |
| WO | WO2012069587 | 5/2012 |

(Continued)

*Primary Examiner* — Victor S Chang

(74) *Attorney, Agent, or Firm* — Kristen Stone; Allison Johnson

(57) ABSTRACT

Disclosed is a self-supporting, heat curable adhesive film including a surface-deactivated solid isocyanate and a blend of two different polyurethanes. A method of making an article that includes the adhesive film and article made thereby are also disclosed.

27 Claims, No Drawings

(56) References Cited

U.S. PATENT DOCUMENTS

2015/0037555 A1    2/2015  Mai et al.
2015/0240128 A1    8/2015  Muvundamina et al.

FOREIGN PATENT DOCUMENTS

| WO | WO2012092620 | 7/2012 |
| WO | WO2015017531 | 2/2015 |
| WO | WO2015130949 | 9/2015 |

US 9,944,834 B2

REACTIVE FILM ADHESIVES WITH ENHANCED ADHESION TO METALLIC SURFACES

This application claims the benefit of U.S. Provisional Application No. 62/091,942, filed Dec. 15, 2014, and U.S. Provisional Application No. 62/091,956, filed Dec. 15, 2014, both of which are incorporated herein.

The invention relates to a self-supporting, heat curable adhesive film. In particular, the adhesive film includes a surface-deactivated solid isocyanate and two different polyurethanes having functional groups reactive with isocyanate.

SUMMARY OF THE INVENTION

In one aspect, the invention features a self-supporting, heat curable adhesive film that includes a surface-deactivated solid isocyanate, a first polyurethane reactive with isocyanate, and a second polyurethane different from the first polyurethane. The second polyurethane is a carboxylic acid functional polyurethane that has an acid number of from 10 to 30, and a unimodal weight average Molecular Weight (Mw) of no greater than about 50,000 g/mole.

In one embodiment, first polyurethane has a weight average Molecular Weight (Mw) of no less than about 50,000 g/mole.

In one embodiment, the self-supporting, heat curable adhesive film is derived from an aqueous composition including a surface-deactivated solid isocyanate, a first polyurethane having functional groups reactive with isocyanate, and a second polyurethane that is different from the first polyurethane. The second polyurethane is a carboxyl acid functional polyurethane having an acid number of from 10 to 30, and a unimodal weight average Molecular Weight (Mw) of no greater than about 50,000 g/mole.

In another aspect, the invention features a method of making an article having a first substrate and a second substrate. The method includes contacting a first substrate with a first major surface of any one of the aforesaid self-supporting, heat curable adhesive films, contacting the second substrate with a second major surface of the film such that the second major surface of the film is in direct contact with the second substrate to form the article, and applying heat and pressure to the article.

In yet another aspect, the invention features a method of making an article having a first substrate and a second substrate. The method includes contacting a first substrate with a first major surface of any one of the aforesaid self-supporting, heat curable adhesive films, applying heat at a temperature of no greater than 55° C. to the film before or after the film is applied to the first substrate, contacting the second substrate with a second major surface of the film such that the second major surface of the film is in direct contact with the second substrate to form the article, and applying heat and pressure to the article.

In yet another aspect, the invention features an article including any one of the aforesaid self-supporting, heat curable adhesive films, and a first substrate in direct contact with a first major surface of the self-supporting, heat curable adhesive film.

In one embodiment, the article further includes a second substrate, which is in direct contact with a second major surface of the self-supporting, heat curable adhesive film.

In yet another aspect, the invention features an article including a first substrate, a second substrate, and any one of the aforesaid self-supporting, heat curable adhesive films disposed between the two substrates.

The invention features a self-supporting, heat curable adhesive film useful for forming a bond to a single substrate or for bonding at least two substrates to each other through the adhesive film.

GLOSSARY

The term "self-supporting adhesive film" means an adhesive film that maintains its integrity in the absence of any substrate. In the content of the present invention, a "release liner" is not considered a substrate.

The term "film adhesive" means an adhesive in a form of a film. In the context of the present invention, the term "film adhesive" is interchangeable with the term "adhesive film".

The term "polyurethane" means polyurethane as well as polyurethane that contains urea groups in the backbone of the polyurethane.

The term "aqueous dispersion" means an aqueous dispersion, aqueous emulsion, aqueous suspension, and aqueous solution.

The term "Control I" means the heat curable adhesive composition commercially available under the trade designation EM9002-100 from HB Fuller Company (St. Paul. Minn.).

Other features and advantages will be apparent from the preferred embodiments and from the claims.

DETAILED DESCRIPTION

The self-supporting, heat curable adhesive film includes a surface-deactivated solid isocyanate, a first polyurethane reactive with isocyanate, and a second polyurethane different from the first polyurethane.

The self-supporting, heat curable adhesive film can have any suitable thickness including, e.g., at least 10 microns (μm), at least 25 μm, at least 50 μm, from about 25 μm to about 200 μm, or from about 25 μm to about 150 μm.

The self-supporting, heat curable adhesive film can include a single layer of heat curable adhesive film or multiple layers of heat curable adhesive film. A heat curable adhesive film that includes multiple layers of heat curable adhesive film can be formed using a variety of techniques including, e.g., direct coating one layer on top of the other, passing a dried heat curable adhesive film through a coater multiple times (e.g., an additional aqueous composition that includes polyurethane reactive with isocyanate functionality and surface-deactivated solid polyisocyanate is coated on a dried heat curable adhesive film, and the additional aqueous composition is then dried (the process can be repeated multiple times)), by laminating two heat curable adhesive films together, and combinations thereof. The multiple layers of heat curable adhesive film can be derived from the same or different aqueous compositions.

The self-supporting, heat curable adhesive film can be heated to a temperature e.g., at least 60° C., at least 75° C., from about 60° C. to about 150° C., or from about 75° C. to about 100° C. to activate the cure of the heat curable adhesive film to form a cured bond with a substrate, or between two substrates.

The self-supporting, heat curable adhesive film preferably has a degree of crystallinity and a peak melting temperature that is sufficiently high to allow transportation and storage of the heat curable adhesive film and also sufficiently low to allow heat activation of the cure of the heat curable adhesive film. One useful measure of crystallinity is enthalpy of fusion. The enthalpy of fusion and the peak melting temperature of a self-supporting, heat curable adhesive film is measured using a dried adhesive film. When in the form of a dried film, the self-supporting, heat curable adhesive film exhibits an enthalpy of fusion of at least 25 J/g, from about 25 J/g to about 70 J/g, or from about 35 J/g to about 70 J/g.

The self-supporting, heat curable adhesive film also preferably exhibit a peak melting temperature of at least 30° C., at least 40° C., from about 30° C. to about 80° C., or from about 40° C. to about 60° C.

The self-supporting, heat curable adhesive film is storage stable and remains heat curable when stored at room temperature (i.e., from about 22° C. to about 25° C.).

The self-supporting, heat curable adhesive film exhibits a 180° peel strength increase of at least 30%, at least 50%, at least 60%, relative to a control (EM9002-100 commercially available from HB Full (St. Paul, Minn.), according to the herein described cured 180° peel strength test method.

The self-supporting, heat curable adhesive film is derived from an aqueous composition that includes a surface-deactivated solid isocyanate, a first polyurethane dispersion including a first polyurethane having functional groups that are capable of reacting with isocyanate groups, and a second polyurethane dispersion different from the first polyurethane dispersion. The second polyurethane dispersion includes a carboxylic acid functional polyurethane that has other functional groups reactive with isocyanate. The two polyurethanes dispersions and the surface-deactivated solid polyisocyanate can be supplied separately as a two part system, and then blended together prior to the formation of the film. Alternately, the two polyurethanes dispersions and the surface-deactivated solid polyisocyanate can be supplied as a one part system that includes a blend of the two polyurethane dispersions and the surface-deactivated solid isocyanate.

A variety of methods can be used to prepare the heat curable adhesive film including depositing the aqueous composition onto a release liner, and drying the aqueous composition at a temperature below the temperature at which the activation of the cure between the blend of the two polyurethanes and the surface-deactivated solid isocyanate occurs to form an essentially dry, self-supporting, heat curable adhesive film. The resulting heat curable adhesive film is storage-stable at room temperature.

The self-supporting, heat curable adhesive film can be formed using a variety of application techniques including, spraying (e.g. spiral and splatter spraying), coating (e.g. roll, slot, gravure, curtain, and pattern), and combinations thereof. One useful application method includes roll coating the aqueous composition at a desirable coat weight onto a release liner, and then passing the coated aqueous composition through a drying tunnel to form the dried, heat curable adhesive film. The drying temperature in the tunnel can be any suitable temperature or series of temperatures, but preferably is maintained at a temperature that is sufficiently low to prevent the surface-deactivated solid isocyanate from activating (i.e., crosslinking). During drying the heat curable adhesive film preferably is maintained at a temperature of no greater than about 70° C., no greater than about 60° C., or even no greater than about 55° C. The heat curable adhesive film optionally can be chilled (e.g. by passing the film over a chilled roller). The heat curable adhesive film disposed on the release liner can be wound as a roll, and stored for a later date to be used.

First Polyurethane

The first polyurethane is film-forming and can be a single type of polyurethane or a blend of at least two different polyurethanes. The first polyurethane includes functional groups that are capable of reacting with isocyanate functional groups. Useful functional groups reactive to isocyanate include hydroxyl, amino, carboxylic acid, amide, mercaptan, and combinations thereof.

The first polyurethane preferably has a weight average molecular weight of no less than 50,000 gram/mole (g/mole), and no greater than 125,000 g/mole, or no greater than 100,000 g/mole.

Suitable first polyurethanes are derived from a polyol and a polyisocyanate. Examples of useful polyols include polyester polyols, polyether polyols, and combinations thereof. Useful polyester polyols include, e.g., crystalline polyester polyols and amorphous polyester polyols.

Suitable polyester polyols include, e.g., polyester polyols derived from linear dicarboxylic acids, derivatives of dicarboxylic acids (e.g., anhydrides, esters and acid chlorides), aliphatic polyols, cyclo aliphatic polyols, linear polyols, branched polyols, and combinations thereof. Examples of useful dicarboxylic acids from which the polyester polyol can be derived include adipic acid, succinic acid, sebacic acid, dodecanedioic acid, and combinations thereof. Examples of useful aliphatic diols from which the polyester polyol can be derived include ethylene glycol, 1,3-propanediol, 1,4-butanediol, 1,5-pentanediol, 1,6-hexanediol, neopentyl glycol, and combinations thereof. Useful polyester polyols include, e.g., polyester polyols derived from 1,4-butanediol, 1,6-hexanediol, and combinations thereof including, e.g., polyester polyols derived from adipic acid and 1,4-butanediol, adipic acid and 1,6-hexanediol, adipic acid, 1,6-hexanediol, and neopentyl glycol, and combinations thereof.

Suitable polyether polyols include the products obtained from the polymerization of a cyclic oxide, e.g., ethylene oxide, propylene oxide, butylene oxide, and tetrahydrofuran, or by the addition of one or more such oxides to polyfunctional initiators having at least two active hydrogens, e.g., water, polyhydric alcohols (e.g., ethylene glycol, propylene glycol, diethylene glycol, cyclohexane dimethanol, glycerol, trimethylol-propane, pentaerythritol and bisphenol A), ethylenediamine, propylenediamine, triethanolamine, and 1,2-propanedithiol. Particularly useful polyether polyols include, e.g., polyoxypropylene diols and triols, poly(oxyethylene-oxypropylene)diols and triols obtained by the simultaneous or sequential addition of ethylene oxide and propylene oxide to appropriate initiators and polytetramethylene ether glycols obtained by the polymerization of tetrahydrofuran.

Useful first polyisocyanates have at least two free isocyanate groups in each molecule and include, e.g., diiosocyantes, triisocyanates, higher order polyisocyanates, and combinations thereof). Examples of useful polyisocyanates include e.g., aliphatic isocyanates (e.g. hexamethylene diisocyanate (HDI)), tetramethylxylylene diisocyanate (TMXDI)), cycloaliphatic isocyanates (e.g., 1-isocyanto-3,3,5-trimethyl-5-isocyanatomethyl-cyclohexane (IPDI), hydrogenated methylene diphenyl diisocyanate ($H_{12}MDI$)), heterocyclic isocyanates, and aromatic isocyanates (e.g. methylene diphenyl diisocyanate (MDI), toluene diisocyanate (TDI)), napthalene-1,5-diisocyanate (NDI), 3,3'-dimethyl-biphenyl-4,4'-diisocyanate (TODI), dimeric MDI, the uretdione of MDI (MDIU), the uretdione of TDI (TDIU), 3,3'-diisocyanate-4,4'-dimethyl-N,N'-diphenyl urea (TDIH), addition product of 2 moles of 1-methyl-2,4-phenylenediisocyanate with 1 mole of 1,2-ethandiol or 1,4-butandiol; addition product of 2 moles of MDI to 1 mole of diethylene glycol; and the combinations thereof.

Useful first polyurethanes can be in the form of aqueous polyurethane dispersions, preferably anionic polyurethane dispersions. Examples of useful commercially available polyurethane dispersions include DISPERCOLL U53, DISPERCOLL U56, DISPERCOLL U XP 2682, DISPERCOLL U 8755, DISPERCOLL U 2815 XP, DISPERCOLL U54, DISPERCOLL U XP 2710, DISPERCOLL U 2849 XP, DISPERCOLL U42 AND DISPERCOLL U XP 2643, all of which are available from Bayer Material Science AG (Germany); and LUPHEN 585, LUPHEN 3615, LUPHEN D 207 E and LUPHEN D DS 3548, all of which are available from BASF, Germany.

Second Polyurethane

The second polyurethane is different from the first polyurethane. The second polyurethane is a carboxyl acid functional polyurethane having an acid number of from 10 to 30, or from 15 to 25 mg/g KOH.

The second polyurethane preferably has a relatively low weight average molecular weight (Mw). Preferably the second polyurethane has a unimodal weight average molecular weight of no greater than 50,000 g/mole.

The second polyurethane is film-forming and can be a single type of carboxyl acid functional polyurethane or a blend of at least two different carboxyl acid functional polyurethanes.

The second polyurethane may include additional functional groups that are capable of reacting with isocyanate functional groups. Useful functional groups reactive to isocyanate include e.g., hydroxyl, amino, amide, mercaptan, and combinations thereof.

Useful second polyurethanes can be in the form of aqueous polyurethane dispersions. An example of a useful polyurethane dispersion is DISPERCOLL U 2824 XP commercially available from Bayer Material Science AG (Germany).

The heat curable adhesive film includes at least 30% by weight, at least 50% by weight, at least 70% by weight, at least 80% by weight, from about 30% by weight to about 97% by weight, from about 50% by weight to about 95% by weight, from about 70% by weight to about 95% by weight, or from about 80% by weight to about 95% by weight of the mixture of a first polyurethane and a second polyurethane, based on the weight of the dried heat curable adhesive film.

The second polyurethane is present in an amount of at least 10% by weight, at least 20% by weight, from about 10% by weight to about 60% by weight, from about 20% by weight to about 50% by weight of the second polyurethane, based on the weight of the mixture of a first polyurethane and a second polyurethane.

Surface-Deactivated Solid Isocyanate

The surface-deactivated solid isocyanate is in the form of a solid particulate and functions as a crosslinking agent. Useful surface-deactivated solid isocyanate can be derived from a polyisocyanate and a deactivating agent.

A variety of polyisocyanates are suitable including, e.g., aliphatic, cycloaliphatic, heterocyclic, and aromatic isocyanates. Specific examples of useful polyisocyanates include dimeric 4,4'-MDI, the uretdione of MDI (MDIU), the uretdione of TDI (TDIU), 3,3'-diisocyanate-4,4'-dimethyl-N,N'-diphenyl urea (TDIH), the addition product of 2 moles of 1-methyl-2,4-phenylene-diisocyanate and 1 mole of 1,2-ethandiol or 1,4-butandiol, the addition product of 2 moles of MDI and 1 mole of diethylene glycol, the isocyanurate of isophoron diisocyanate (IPDI-T), and combinations thereof.

Commercially available solid isocyanates that can be surface-deactivated include the uretdione of TDI (e.g., ADOLINK TT available from Rhein Chemie Rheinau GmBH (Mannheim, Germany), DANCURE 999 available from Danquinsa GmBH (Germany), THANECURE T9 (TSE, Clearwater, Fla.)); DESMODUR LP BUEJ 471, which is a micronized IPDI-isocyanurate available from Bayer Material Science AG (Germany); and the uretdione of MDI (GRILBOND A2BOND available from EMS-Griltech (Switzerland)).

The surface-deactivated solid isocyanate preferably is deactivated by the presence of a deactivating agent. Useful deactivating agents include, e.g., primary aliphatic amines, secondary aliphatic amines, diamines, polyamines, hydrazine derivatives, amidines, guanidines, and combinations thereof. Examples of useful deactivating agents include ethylene diamine, 1,3-propylene-diamine, diethylene triamine, triethylene tetramine, 2,5-dimethyl-piperazine, 3,3'-dimethyl-4,4'-diamino-dicyclohexyl methane, methyl nonane-diamine, isophorone diamine, 4,4'-diaminodicyclohexyl methane, diamino polypropylene ether, triamino polypropylene ether, polyamido amine, the deactivating agents disclosed in U.S. Pat. No. 6,348,548 B1, and combinations thereof.

The surface-deactivated solid isocyanates can be prepared according to a variety of methods including, e.g., the processes described in U.S. Pat. No. 6,348,548 B1, which is incorporated herein by its entirety.

The surface-deactivated solid isocyanate can be in a variety of forms including, e.g., aqueous suspensions, micronized particles, and combinations thereof.

Useful commercially available surface-deactivated solid isocyanates include, e.g., DISPERCOLL BL XP 2514 (an aqueous suspension of surface-deactivated isocyanate containing approximately 40% of the uretdione of TDI) available from Bayer Material Science AG (Germany)) and Aqualink U available from Aquaspersions Limited (UK).

The surface-deactivated solid isocyanate can be blended with the polyurethane dispersion to form a stable aqueous composition.

The aqueous composition preferably includes at least 0.25% by weight, at least 0.5% by weight, at least 1% by weight, from about 0.25% by weight to about 10% by weight, from about 0.5% by weight to about 8% by weight, or even from about 1% by weight to about 5% by weight surface-deactivated isocyanate, based on the weight of the aqueous composition.

Additional Components

The self-supporting, heat curable adhesive film and the aqueous composition optionally include a variety of other additives including, e.g., other polymers, catalysts (e.g. amine based), preservatives, pH modifiers (e.g. aqueous ammonia), adhesion promoters (e.g., silane containing compounds), tackifiers, (e.g., ground tackifiers), pigments, surfactants, antifoaming agents, defoaming agents, fungicides, bactericides, thickening agents, blocking agents and stabilizers (e.g. amines), fillers (e.g. carbonates, talc, starch), materials that help the adhesive film to form a barrier (e.g. nano clay), insulative materials (e.g. mineral fillers, glass microbubbles), rheology modifiers, salts, and ground powders, electrically conductive materials (e.g. various metals (e.g. silver)), and combinations thereof.

Other suitable polymers (which are refers to as a third polymer that can be included in the aqueous composition include, e.g., polyurethanes that are not reactive with isocyanate functionality; vinyl acetate ethylene copolymers (VAE); polyacrylates that are not reactive with isocyanate functionality; polyacrylonitriles (e.g., butadiene acrylonitrile); styrene butadiene rubber (SBR); and combinations thereof.

When a third polymer is present in the self-supporting, heat curable adhesive film, the sum of the first polyurethane, the second polyurethane, the surface-deactivated solid isocyanate, and the third polymer amounts to at least 90% by weight, at least 95% by weight, or even at least 98% of the weight of the dried, self-supporting, heat curable adhesive film.

One example of a useful stabilizer is JEFFAMINE T-403 POLYETHERAMINE commercially available from Huntsman Corporation (The Woodlands, Tex.).

Useful thickeners include, e.g., BORCHI®GEL A LA available from OMG Borchers GmbH (Langenfeld, Germany) and STEROCOLL HT commercially available from BASF Chemical Company (Ludwigshafen, Germany).

One example of a useful preservative is ACTICIDE MBS commercially available from Thor GmbH (Speyer, Germany).

Article

The self-supporting, heat curable adhesive film can be used to manufacture an article including at least one substrate, or an article including a first substrate and a second substrate.

In one embodiment, an article includes a self-supporting, heat curable adhesive film of the invention and at least one substrate. The adhesive film is disposed on one major surface of the substrate. The substrate can be a metallic substrate or a non-metallic substrate.

In another embodiment, an article includes a first substrate, a second substrate, and a self-supporting, heat curable adhesive film of the invention disposed between the two substrates, and in direct contact with the two substrates. One of the first substrate and the second substrate is a metallic substrate. The other one of the first substrate and the second substrate can be the same or different substrate, and, if different, can be selected from any one of the herein described "non-metallic" substrates, or from different type of metallic substrates.

Examples of metallic substrates include aluminum, steel, copper, metallic composites, metallic foil, metallic film, metallized surfaces, and combinations thereof.

Examples of non-metallic substrates include various textiles (e.g. fabrics (e.g. microfiber based polyethylene, cotton, canvas and nonwovens), artificial leathers and furs, foils (e.g. decorated foils), papers, films (e.g. plastic films (e.g. polyester, polyimide (i.e. Kapton), polypropylene and polyethylene)), and combinations thereof.

Examples of other non-metallic substrates include tiles, ceramics, plastics (e.g., polyamides (e.g. nylon), polyurethanes, polycarbonate, acrylonitrile-butadiene-styrene (ABS), ABS/polycarbonate blends, polyether ether ketone (PEEK), etc.), plastic composites (e.g. fiber reinforced plastics), glass, cardboard, wood and wood-containing products.

The first and the second substrates can be of the same or different material, but at least one of the first and second substrates is a metallic substrate.

The substrates can be in the form of a single layer or multiple layers.

The substrates can be pre-treated to improve adhesion of the adhesive film to the substrate. Useful pre-treatments include, e.g., corona, plasma, flame, chemical primer, and combinations thereof.

The article of invention can be made by various methods.

In one embodiment, an article having a first substrate and a second substrate is prepared by contacting a first substrate with a first major surface of any one of the aforesaid self-supporting, heat curable adhesive films, contacting the second substrate with a second major surface of the film such that the second major surface of the film is in direct contact with the second substrate to form the article, and applying heat and pressure to the article to cure the adhesive film such that the two substrates are adhered together.

In another embodiment, an article having a first substrate and a second substrate is prepared by contacting a first substrate with a first major surface of any one of the aforesaid self-supporting, heat curable adhesive films, applying heat at a temperature of no greater than 55° C. to the film before or after the film is applied to the first substrate to from a pre-laminate, which could be stored and transported to a different location. Once ready, the pre-laminate is used to make the final article by contacting the second substrate with a second major surface of the film such that the second major surface of the film is in direct contact with the second substrate to form the article, and applying heat and pressure to the article to cure the adhesive film such that two substrates are adhered together through the adhesive film.

The article can be heated to a temperature e.g., at least 60° C., at least 75° C., from about 60° C. to about 150° C., or from about 75° C. to about 100° C. to activate the cure of the heat curable adhesive film to form a cured bond with a substrate, or between two substrates. Pressure can be used to help form the bond (e.g. membrane or bladder press, heated platens).

Uses

The self-supporting, heat curable adhesive film is useful in a variety of applications including, e.g., temporarily bonding at least one substrate, permanently bonding at least one substrate or two substrates, protecting a substrate, inhibiting or preventing the movement of a first substrate relative to a second substrate, and combinations thereof. The adhesive film is also useful in a variety of processes including, e.g., manufacturing processes (e.g., bonding two parts of an article together and maintaining two parts in fixed relation to one another during the manufacturing process), shipping processes, stacking processes, and combinations thereof.

The self-supporting, heat curable adhesive film can be used in the manufacture of a variety of articles including, e.g., automobile parts, truck bed covers, textile laminations, various assembled goods, and electronics.

The invention will now be described by way of the following examples. All ratios and percentages are by weight unless otherwise indicated.

EXAMPLES

Test Procedures

Test procedures used in the examples and throughout the specification, unless stated otherwise, include the following.

Molecular Weight

The gel permeation chromatography (GPC) molecular weight distribution curve of each polyurethane sample is obtained using a Waters 2695 Separations Module connected to a Waters 2414 Refractive Index (RI) detector, running 0.05 molar (M) lithium bromide dimethyl formamide (LiBr/DMF) mobile phase through two Agilent Resipore GPC columns. The weight average molecular weight (Mw) data is calculated versus polymethyl methacrylate standards.

Peak Melting Temperature and Enthalpy of Fusion Test Method

The peak melting temperature and enthalpy of fusion ($\Delta H$) of the dried, heat curable adhesive film is determined, after removal of the heat history, using a Perkin Elmer, Pyris 1 Differential Scanning Calorimetry (DSC), at a heating rate of 10° C. per minute.

Acid Number

Acid number is determined according to ASTM D 4662 entitled "Standard Test Method for Polyurethane Raw Materials: Determination of Acid and Alkalinity Number of Polyols" with the exception that isopropanol is used instead of ethanol.

Cured 180 Degree Peel Strength Test Method

The cured 180 degree (180°) peel strength is determined, using an Instron tester model 5500R (Instron Corporation, Norwood, Mass.), according to the ASTM D903-98 test method entitled "Standard test method for Peel or Stripping Strength of Adhesive Bonds", with the following exceptions:

1. Test Speed/Rate of travel of the power-actuated grip: A speed of 300 mm/min is used for sample testing instead of 305 mm/min.
2. Length of test substrates and bond:
    7 inch (in) (177.8 mm) flexible substrates are used for testing instead of 12 in (304.8 mm) flexible substrates
    3 in (76.2 mm) rigid substrates are used for testing instead of 8 in (203.2 mm) rigid substrates
    A bond length of 2.5 in (63.5 mm) inches is used for testing instead of a bond length of 6 in (152.4 mm); and
3. Samples are conditioned 25° C.+/−1° C. and 50%+/−2% relative humidity for 24 hours.

The mean of the average peel strength for a set of six samples is reported in N/25 mm.

Sample Preparation for Cured 180 Degree Peel Strength Test

A 1 in×3 in×0.040 in (25.4 mm×76.2 mm×1 mm) piece of a rigid Stainless Steel (SS) substrate (Grade 304, from Q-Lab, Westlake, Ohio) is wiped down with isopropyl alcohol (IPA) and dried. A 1 in×2.5 in×0.004 in (25.4 mm×63.5 mm×0.1 mm) piece of the film adhesive is removed from the release liner and is placed on the SS substrate. A 1 in×7 in (25.4 mm×177.8 mm) flexible nylon substrate is then placed on top of the SS/film adhesive layered construction. The nylon fabric is NYLON SUPPLEX (Invista, Wichita, Kans.), Blue Periwinkle Fabric with a weight of 117.4 g/m², or equivalent. The SS/adhesive film/nylon fabric layered construction is then bonded together using a heated platen press at a temperature sufficient to activate curing of the heat curable film. The construction is bonded together using a heated platen press under the following conditions:

Bond Line Temperature: 90° C.
Pressure: 22 N/cm² (on the sample); and
Time at Bond Line Temperature: 60 seconds.

An example of a suitable heated platen press Sonitek Spectrum Heat Sealer, Model SB-3 4.2 commercially available from Sonitek (Milford, Conn.)

EXAMPLES

Acid number and weight average molecular weight of each commercially available polyurethane dispersion were tested according to there herein described Acid Number and Molecular Weight Test Methods. The results are set forth in Table 1 below.

TABLE 1

|  | Acid Number (from Carboxylic Acid) | Mw (g/mole) |
| --- | --- | --- |
| Dispercoll U XP2682 | 0 | 73,800 |
| Dispercoll U56 | 0 | 73,600 |
| Dispercoll U 2824XP | 20.2 | 42,900 |
| Bayhydrol UH2606 | 18.1 | Bimodal, 1,690,000 and 50,500 |
| Neorez R-9249 | 15.4 | Bimodal, 1,410,000 and 25,000 |

Examples 1-3 and Comparative Examples 1-3

Each of the self-supporting, heat curable adhesive films of the Control, Comparative Examples 1-3 and Examples 1-3 was derived from aqueous compositions as set forth in Table 2. The thickness of the adhesive films were 100 μm+/−10 μm.

A test specimen was prepared according to the sample preparation method set forth in the Cured 180 Degree Peel Strength Test Method using each adhesive film of Examples 1-3 and Comparative Examples 1-3. The test specimen was then tested according to herein described various test methods. The results are also set forth in Table 2.

TABLE 2

|  | Control* | Com Ex 1 | Com Ex 2 | Com Ex 3 | Ex 1 | Ex 2 | Ex 3 |
| --- | --- | --- | --- | --- | --- | --- | --- |
| Dispercoll U XP2682 |  | 60 | 60 | 25.0 | 60 | 73.7 | 69.7 |
| Dispercoil U56 |  | — | — | — | — | — | — |
| Dispercoll U 2824XP |  | — | — | 69.7 | 32.7 | 21.0 | 21.0 |
| Bayhydrol UH2606 |  | 32.7 | — | — | — | — | — |
| Neorez R-9249 |  | — | 32.7 | — | — | — | — |
| Dispercoll BL XP 2514 |  | 6 | 6 | 4 | 6 | 4 | 6 |
| Jeffamine T-403 |  | 0.1 | 0.1 | 0.1 | 0.1 | 0.1 | 0.1 |
| Borchigel ALA |  | 1.2 | 1.2 | 1.2 | 1.2 | 1.2 | 1.2 |
| ΔH (J/g) | 43.7 | 27.5 | 33.1 | 43.2 | 39.4 | 41.9 | 49.6 |
| Melting Peaks Temp. (° C.) | 47.7, 53.9 | 48.5, 55.5 | 49.5, 54.0 | 47.6 | 48.7, 53.7 | 46.7, 53.7 | 49.6 |
| Peel Strength (N/25 mm) | 69.3 +/− 13.4 | 21.9 +/− 7.4 | 37.4 +/− 2.5 | 58.1 +/− 2.2 | 94.6 +/− 7.9 | 103.1 +/− 3.4 | 92.0 +/− 5.3 |

*EM9002-100, commercially available from HB Fuller (St. Paul, MN)

Other embodiments are within the claims. All publications cited herein are incorporated herein in their entirety.

We claim:

1. A self-supporting, heat curable adhesive film, comprising:
   a surface-deactivated solid isocyanate,
   a first polyurethane having functional groups reactive with isocyanate, and
   a second polyurethane different from the first polyurethane, the second polyurethane being a carboxylic acid functional polyurethane having an acid number of from 10 to 30, and a unimodal weight average molecular weight (Mw) of no greater than about 50,000 g/mole,
   wherein the adhesive film exhibits a 180 degree peel strength that is at least 30% greater than the 180 degree peel strength of Control I, when tested according to the Cured 180 Degree Peel Strength Test Method.

2. The self-supporting, heat curable adhesive film of claim 1, wherein the adhesive film has a thickness of from about 10 microns to about 200 microns.

3. The self-supporting, heat curable adhesive film of claim 1, wherein the adhesive film has an enthalpy of fusion of at least about 25 J/g.

4. The self-supporting, heat curable adhesive film of claim 1, wherein the first polyurethane has a weight average molecular weight (Mw) of no less than about 50,000 g/mole.

5. A self-supporting, heat curable adhesive film derived from an aqueous composition comprising:
   a surface-deactivated solid isocyanate,
   a first polyurethane dispersion including a first polyurethane having functional groups reactive with isocyanate, and
   a second polyurethane dispersion including a second polyurethane different from the first polyurethane, the second polyurethane being a carboxyl acid functional polyurethane having an acid number of from 10 to 30, and a unimodal weight average molecular weight (Mw) of no greater than about 50,000 g/mole.

6. The self-supporting, heat curable adhesive film of claim 5, wherein the adhesive film exhibits a 180 degree peel strength that is at least 30% greater than the 180 degree peel strength of Control I, when tested according to the Cured 180 Degree Peel Strength test method.

7. The self-supporting, heat curable adhesive film of claim 5, wherein the adhesive film has an enthalpy of fusion of at least about 25 J/g.

8. The self-supporting, heat curable adhesive film of claim 5, wherein the first polyurethane has a weight average molecular weight (Mw) of no less than about 50,000 g/mole.

9. The self-supporting, heat curable adhesive film of claim 5, wherein the first polyurethane includes functional groups comprising hydroxyl, amino, carboxylic acid, amide, mercaptan, and combinations thereof.

10. The self-supporting, heat curable adhesive film of claim 5, wherein the sum of the surface-deactivated solid isocyanate, the first polyurethane, the second polyurethane, and a third polymer amounts to at least about 95% by weight of the self-supporting adhesive film.

11. An article comprising:
    the self-supporting, heat curable adhesive film of claim 1 having a first surface and a second surface, and
    a first substrate in direct contact with the first surface of the adhesive film.

12. The article of claim 11, wherein the first substrate is a metallic substrate or a non-metallic substrate.

13. An article comprising:
    the self-supporting, heat curable adhesive film of claim 5 having a first surface and a second surface, and
    a first substrate in direct contact with the first surface of the adhesive film.

14. The article of claim 13, wherein the first substrate is a metallic substrate or a non-metallic substrate.

15. An article comprising:
    a first substrate,
    a second substrate, and
    the self-supporting, heat curable adhesive film of claim 1 disposed between the first substrate and the second substrate.

16. The article of claim 15, wherein one of the first substrate and the second substrate is a metallic substrate.

17. An article comprising:
    a first substrate,
    a second substrate, and
    the self-supporting, heat curable adhesive film of claim 5 disposed between the first substrate and the second substrate.

18. The article of claim 17, wherein one of the first substrate and the second substrate is a metallic substrate.

19. A method of making an article having a first substrate and a second substrate, the method comprising:
    contacting a first substrate with a first major surface of the self-supporting, heat curable adhesive film of claim 1,
    applying heat at a temperature of no greater than 55° C. to the film before or after the film is applied to the first substrate,
    contacting the second substrate with a second major surface of the self-supporting, heat curable adhesive film such that the second major surface is in direct contact with the second substrate to form the article, and
    applying heat and pressure to the article.

20. The method of claim 19, wherein one of the first and the second substrates is a metallic substrate.

21. A method of making an article having a first substrate and a second substrate, the method comprising:
    contacting a first substrate with a first major surface of the self-supporting, heat curable adhesive film of claim 5,
    applying heat at a temperature of no greater than 55° C. to the film before or after the film is applied to the first substrate,
    contacting the second substrate with a second major surface of the self-supporting, heat curable adhesive film such that the second major surface is in direct contact with the second substrate to form the article, and
    applying heat and pressure to the article.

22. The method of claim 21, wherein one of the first and the second substrates is a metallic substrate.

23. A method of making an article having a first substrate and a second substrate, the method comprising:
    contacting a first substrate with a first major surface of the self-supporting, heat curable adhesive film of claim 1,
    contacting the second substrate with a second major surface of the self-supporting, heat curable adhesive film such that the second major surface is in direct contact with the second substrate to form the article, and
    applying heat and pressure to the article.

24. The method of claim 23, wherein one of the first and the second substrates is a metallic substrate.

25. A method of making an article having a first substrate and a second substrate, the method comprising:

contacting a first substrate with a first major surface of the self-supporting, heat curable adhesive film of claim 5, contacting the second substrate with a second major surface of the self-supporting, heat curable adhesive film such that the second major surface is in direct contact with the second substrate to form the article, and applying heat and pressure to the article.

26. The method of claim 25, wherein one of the first and the second substrates is a metallic substrate.

27. The self-supporting, heat curable adhesive film of claim 1, wherein at least 30% by weight of the film is the sum of the weight of the first polyurethane and the weight of the second polyurethane.

* * * * *